United States Patent

[11] 3,593,191

[72] Inventor Heinz Henker
Munich, Germany
[21] Appl. No. 860,634
[22] Filed Sept. 24, 1969
[45] Patented July 13, 1971
[73] Assignee Siemens Aktiengesellschaft
Berlin, Germany
[32] Priority Sept. 30, 1968
[33] Germany
[31] P 17 89 061.8

[54] ELECTRICALLY FOCUSSED LASER DIODE
8 Claims, 4 Drawing Figs.

[52] U.S. Cl. ........................................... 331/94.5,
317/234, 356/120, 356/210
[51] Int. Cl. ............................................. H01s 3/18
[50] Field of Search ................................. 331/94.5;
317/234; 356/120, 103, 237, 209, 210

[56] References Cited
UNITED STATES PATENTS

| | | | |
|---|---|---|---|
| 2,311,101 | 2/1943 | Tuttle | 356/210 |
| 2,730,922 | 1/1956 | Beard | 356/210 |
| 2,806,401 | 9/1957 | Demuth et al. | 356/237 |
| 3,245,002 | 4/1966 | Hall | 391/94.5 |
| 3,303,432 | 2/1967 | Garfinkel et al | 391/94.5 |
| 3,344,365 | 9/1967 | Lewis | 391/94.5 |
| 3,395,368 | 7/1968 | Koester | 391/94.5 |
| 3,402,366 | 9/1968 | Williams et al | 391/94.5 |
| 3,451,008 | 6/1969 | Dunne | 391/94.5 |
| 3,517,281 | 6/1970 | Mlovsky et al. | 317/237 |
| 3,537,028 | 10/1970 | Pankove | 331/94.5 |

FOREIGN PATENTS

| | | |
|---|---|---|
| 640,691 | 7/1960 | Great Britain |

Primary Examiner—R. L. Wibert
Assistant Examiner—Edward S. Bauer
Attorneys—Curt M. Avery, Arthur E. Wilfond, Herbert L. Lerner and Daniel J. Tick

ABSTRACT: A laser diode for producing focused or defined divergent light comprises a semiconductor crystal having a planar PN junction and two parallel end faces extending perpendicular to the PN junction and conjointly forming a resonator for optical radiation. The end faces comprise portions of two confocal surfaces. The PN junction extends between the two confocal surfaces in a radial plane relative to the focal locus. One of the end faces is impermeable to optical radiation and the other of the end faces is a mirror partially permeable to optical radiation.

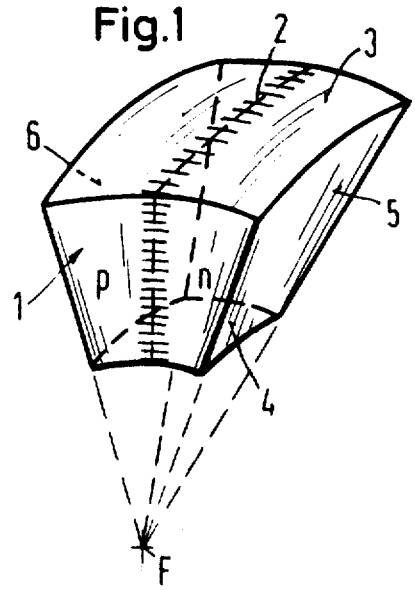
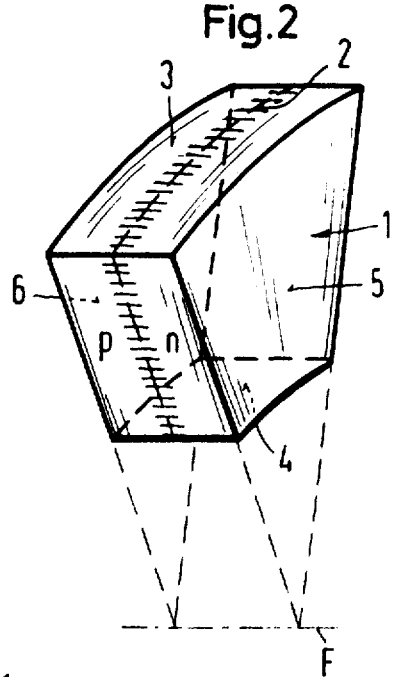
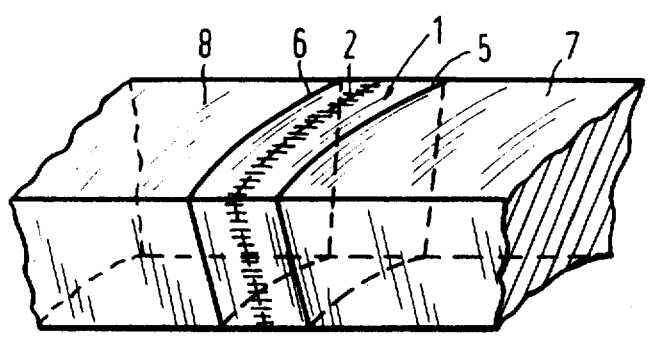
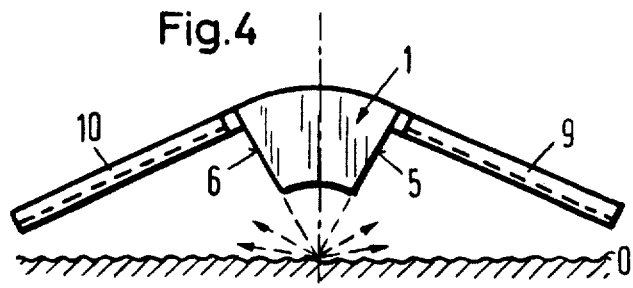

ELECTRICALLY FOCUSSED LASER DIODE

DESCRIPTION OF THE INVENTION

The invention relates to a laser diode. More particularly, the invention relates to an electrically focused laser diode.

The diode of my invention produces focused or defined divergent light. The laser diode comprises a semiconductor crystal having a planar PN junction and two parallel end faces extending perpendicularly to said PN junction and forming a resonator for optical radiation.

The laser diodes or luminescence diodes function in accordance with the laser principle. A laser diode comprises an A'''B' semiconductor crystal, particularly gallium arsenide, with two oppositely doped areas or regions, as known.

A laser diode is basically a semiconductor diode, defined by at least two exactly planar-parallel end faces extending perpendicularly to the PN junction, in the form of a resonator in accordance with the principle of the Fabry-Perot interferometer and operated in the forward direction. The radiation-emittable energy states are excited electrically rather than by optical means as in other solid state laser types. The electrical excitation of the radiation-emittable energy states is effected in a laser diode by the injection of electrons and holes into the barrier layer or PN junction of the diode and in a very narrow region adjacent both sides of the PN junction area. The wavelength of the emitted radiation is determined in a semiconductor primarily by the width of the forbidden zone of the semiconductor material utilized.

Until my invention, it has been customary to utilize suitable optical auxiliary means such as, for example, lenses and mirror devices, for focusing or producing a defined divergent bundle or beam of coherent light, produced in the laser diode. The utilization of optical auxiliary devices of this type is relatively intricate, necessitating an exact adjustment of the individual components. Furthermore, the intensity of the produced light is diminished by absorption.

The principal object of the present invention is to provide a new and improved laser diode.

An object of the invention is to provide an electrically focused laser diode.

An object of the invention is to provide a laser diode which produces a defined divergent bundle of light or a very intensive, narrow strip or point of light, having a diameter or width of a few microns.

An object of the invention is to provide a laser diode which produces focused or defined divergent light with a simple structure, efficiency, effectiveness and reliability.

In accordance with my invention, a laser diode for producing focused or defined divergent light comprises a semiconductor crystal having a planar PN junction and two parallel end faces extending perpendicular to the PN junction and conjointly forming a resonator for optical radiation. The end faces comprise portions of two confocal surfaces. The PN junction extends between the two confocal surfaces in a radial plane relative to the focal locus. One of the end faces is impermeable to optical radiation and the other of the end faces is a mirror partially permeable to optical radiation.

Each of the confocal surface portions may be of spherical configuration and the plane of the PN junction extends through the center of the sphere. Each of the confocal surface portions may be of cylindrical configuration and the plane of the PN junction extends perpendicularly to the axis of the cylinder.

The one of the end faces at the greater radial distance from the focal locus may be impermeable and the other of the end faces may be partially permeable to optical radiation. The one of the end faces at the shorter radial distance from the focal locus may be impermeable and the other of the end faces may be partially permeable to optical radiation.

The semiconductor crystal has two contact faces on opposite sides of the crystal extending parallel to the plane of the PN junction. Electrical contact and heat sink structures may be in conductive contact with the contact faces of the semiconductor crystal. Each of a pair of electrical contact blocks of good heat conducting material may be in conductive contact with a corresponding one of the contact faces of the semiconductor crystal.

Each of a pair of light-responsive sensors may be affixed to a corresponding one of the sides of the crystal. Each of the sensors extends away from the semiconductor crystal substantially perpendicularly to the corresponding side. Each of the light-responsive sensors is of area-type and has a length which is greater than the greatest distance between the contact faces of the semiconductor crystal.

The semiconductor crystal has a dimension perpendicular to the PN junction which does not substantially exceed the luminescent region of the semiconductor crystal.

It is thus seen that, in accordance with my invention, the end faces of a laser diode are designed as portions of two confocal spherical or cylindrical surfaces, wherebetween the surface of the PN junction extends in radial directions. One of the end faces is impermeable to optical radiation and the other of the end faces is partially permeable to the optical radiation and forms a mirror.

When the two end faces of the diode functioning as a reflector are designed as portions of two confocal cylindrical surfaces, the PN junction plane extends perpendicularly to the axis of the cylinder.

The end face which is provided for the larger radius is preferably impermeable to optical radiation, while the end face provided for the smaller radius is partially permeably mirrored for optical radiation. The focusing laser diode of the invention provides an intensive, small light source which is well suited for drawing photomasks on photosensitive material. This permits the drawing of masks for semiconductor integrated circuits on a relatively small scale. It may also be utilized to record sound traces and video images, and the like, on photosensitive recording media. Recording is effected, with adequate cooling and with the assistance of permanent light, for example, by light pulses which are closely spaced adjacent each other.

In another embodiment of the laser diode of the invention, the end face having the smaller radius of curvature is impermeably mirrored for optical radiation, while the end face having the larger radius of curvature is partially permeably mirrored for optical radiation. As a result, a divergent bundle of rays is emitted from the laser diode via the end face having the larger radius of curvature. The laser beam has a large cross-sectional area. If necessary, the laser beam having a large cross-sectional area may be easily focused by means of auxiliary optical components such as, for example, lenses, either parallel or convergent, without damage to the lenses or their binding due to the laser beam. The lenses or their binding may easily be damaged by bundles of intensive laser rays having small cross-sectional areas.

It is particularly expedient to provide better cooling for the laser diode of the invention by providing both outer contact surfaces of the semiconductor crystal, which surfaces extend in parallel with the PN junction plane, with good heat conducting contact blocks. It is also preferable to provide the contact blocks with a cooling device. In order to provide optimum cooling, it is particularly preferred to provide extensions for the semiconductor crystal extending perpendicularly to the plane of the PN junction and having a length much greater than the widest distance of the luminescence region, by a factor of 1 to 5, for example.

In order that the present invention may be readily carried into effect, it will now be described with reference to the accompanying drawing, wherein:

Fig. 1 is a perspective view of an embodiment of the laser diode of the invention;

FIG. 2 is a perspective view of another embodiment of the laser diode of the invention;

FIG. 3 is a perspective view of the laser diode of the present invention with cooling blocks affixed thereto; and FIG. 4 is a schematic diagram of the laser diode of the invention with light-responsive sensors affixed thereto.

In the figures, the same components are identified by the same reference numerals. FIG. 1 illustrates a laser of my invention for producing focused light. The semiconductor crystal 1 comprises a region of P conductivity type and a region of N conductivity type having a contact area along which the plane of a PN junction 2 extends. The end faces 3 and 4 of the semiconductor crystal 1 function as a resonator for optical radiation. The end faces 3 and 4 are perpendicular to the plane of the PN junction are designed, in the embodiment of FIG. 1, as portions of two confocal spherical surfaces. The PN junction 2 extends radially between the N faces 3 and 4 as shown in FIG. 1.

The end face 3 of the semiconductor crystal 1 has a larger radius of curvature than the end face 4 thereof. The end face 3 is impermeable to optical radiation and the end face 4 is mirrored and is partially permeable to radiation, so that the multiple reflecting coherent optical radiation is produced outside the laser diode via the partially permeable mirrored end face 4. The radiation which is produced outside the laser diode is concentrated at a focal point F. The distance of the focal point F from the end face 4 of the laser diode is determined by the curvature of the two confocal spherical surfaces 3 and 4.

The semiconductor crystal 1 has a pair of sides, outer surfaces or contact faces 5 and 6 extending in parallel with the plane of the PN junction 2. The outer surfaces 5 and 6 are provided with electrical contacts which are affixed thereto in electrical contact therewith, and through which the voltage is applied in the forward direction. The electrical contacts or electrodes, electrically contacting the sides 5 and 6, are not shown in the FIGS. in order to enhance the clarity of presentation.

The embodiment of FIG. 2 of the laser diode of the invention functions to focus coherent light. The end faces 3 and 4 of the semiconductor crystal 1 function has a reflector for the coherent optical radiation produced therein at the plane of the PN junction 2. The end faces 3 and 4 of the semiconductor crystal 1 are designed as portions of two confocal cylindrical surfaces. The plane of the PN junction 2 extends perpendicularly to the axis of the cylinders and parallel to the two contact faces 5 and 6 of the semiconductor crystal 1. The light emitted from the partially permeably mirrored cylindrical surface portion 4 is focused at a focal line F.

FIG. 3 shows a laser diode of the invention provided with two good heat conducting contact blocks 7 and 8. The contact block 7 is in contact with and adjacent the contact face 5 of the semiconductor crystal 1 and the contact block 8 is in contact with and adjacent the contact face 6 of said semiconductor crystal. The contact faces 5 and 6 are parallel to the plane of the PN junction 2, which PN junction extends perpendicularly to the two confocal end faces 3 and 4 of the semiconductor crystal 1. Better cooling may be provided by utilizing a suitable cooling device, which is not shown in the FIGS., with the contact blocks 7 and 8.

FIG. 4 illustrates a focusing laser diode of the type of the invention utilized for measuring surface roughness. To accomplish this, two extending photosensitive structural components 9 and 10 are utilized. The photosensitive structural component 9 extends from the contact face 5 of the semiconductor crystal 1 perpendicularly to said contact face, and the photosensitive structural component 10 extends from the contact face 6 of said semiconductor crystal perpendicularly of said contact face. As in the previously illustrated embodiments of the laser diode, the contact faces are parallel to the plane of the PN junction.

The focal point of the laser diode is utilized to scan a surface 0, either continuously or in pulse operation. When the surface 0 is planar, and the coherent light produced in the semiconductor crystal 1 impinges perpendicularly on the average, the light is reflected into the diode and the scattered light is uniformly impinged upon the two photosensitive elements or components 9 and 10. When the surface 0 is nonplanar, in the area of the light or focal point, the light is irregularly distributed and impinges upon the photosensitive components 9 and 10. The inclination of the plane may be established from the relationship of the photocurrents produced by the photosensitive components 9 and 10. The ratio of the photocurrents provides the first differential quotient of the configuration of the surface in a specific angular range. Electronic integration may be utilized to provide a standard for the elevations and depressions of the surface.

While the invention has been described by means of specific examples and in specific embodiments, I do not wish to be limited thereto, for obvious modifications will occur to those skilled in the art without departing from the spirit and scope of the invention.

I claim:

1. A laser diode for producing focused light, comprising a semiconductor crystal having a planar PN junction and two parallel end faces extending perpendicular to the PN junction and conjointly forming a resonator for optical radiation, said end faces comprising portions of two confocal surfaces, said PN junction extending between said two confocal surfaces in a radial plane relative to the focal locus, the one of said end faces at the greater radial distance from the focal locus being impermeable to optical radiation and the other of said end faces being a mirror partially permeable to optical radiation.

2. A laser diode as claimed in claim 1, wherein each of said confocal surface portions is of spherical configuration and the plane of said PN junction extends through the center of the sphere.

3. A laser diode as claimed in claim 1, wherein each of said confocal surface portions is of cylindrical configuration and the plane of said PN junction extends perpendicularly to the axis of the cylinder.

4. A laser diode as claimed in claim 1, wherein said semiconductor crystal has two contact faces on opposite sides of said crystal extending parallel to the plane of said PN junction, and further comprising electrical contact and heat sink structures in conductive contact with the contact faces of said semiconductor crystal.

5. A laser diode as claimed in claim 1, wherein said semiconductor crystal has two contact faces on opposite sides of said crystal extending parallel to the plane of said PN junction, and further comprising a pair of electrical contact blocks of good heat conducting material, each of said blocks being in conductive contact with a corresponding one of the contact faces of said semiconductor crystal.

6. A laser diode as claimed in claim 1, wherein said semiconductor crystal has a dimension perpendicular to said PN junction which does not substantially exceed the luminescent region of said semiconductor crystal.

7. A laser diode as claimed in claim 1, wherein said semiconductor crystal has two contact faces on opposite sides of said crystal extending parallel to the plane of said PN junction, and further comprising a pair of light-responsive sensors, each of said sensors being affixed to a corresponding one of said sides and extending away from said semiconductor crystal substantially perpendicularly to the corresponding side.

8. A laser diode as claimed in claim 7, wherein each of said light-responsive sensors is of area type and has a length which is greater than the greatest distance between the contact faces of said semiconductor crystal.